United States Patent
Nakatsutsumi et al.

(10) Patent No.: US 9,653,757 B2
(45) Date of Patent: May 16, 2017

(54) NONAQUEOUS ELECTROLYTE SOLUTION FOR SECONDARY BATTERY, AND LITHIUM SECONDARY BATTERY

(71) Applicant: Panasonic Intellectual Property Management Co., Ltd., Osaka (JP)

(72) Inventors: Takayuki Nakatsutsumi, Osaka (JP); Takashi Takeuchi, Osaka (JP); Takanobu Chiga, Osaka (JP); Miyuki Nakai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 55 days.

(21) Appl. No.: 14/441,429

(22) PCT Filed: Dec. 26, 2013

(86) PCT No.: PCT/JP2013/007637
§ 371 (c)(1),
(2) Date: May 7, 2015

(87) PCT Pub. No.: WO2014/108979
PCT Pub. Date: Jul. 17, 2014

(65) Prior Publication Data
US 2015/0270578 A1    Sep. 24, 2015

(30) Foreign Application Priority Data

Jan. 9, 2013 (JP) .................. 2013-002100

(51) Int. Cl.
*H01M 10/0569* (2010.01)
*H01M 10/0567* (2010.01)
*H01M 10/052* (2010.01)
*H01M 4/583* (2010.01)
*H01M 4/587* (2010.01)

(52) U.S. Cl.
CPC ....... *H01M 10/0569* (2013.01); *H01M 4/583* (2013.01); *H01M 10/052* (2013.01); *H01M 10/0567* (2013.01); *H01M 4/587* (2013.01); *H01M 2220/20* (2013.01); *H01M 2220/30* (2013.01); *H01M 2300/004* (2013.01); *H01M 2300/0028* (2013.01); *H01M 2300/0034* (2013.01); *Y02E 60/122* (2013.01); *Y02P 70/54* (2015.11); *Y02T 10/7011* (2013.01)

(58) Field of Classification Search
CPC ......... H01M 10/0569; H01M 10/0567; H01M 10/052; H01M 4/583; H01M 2300/0034; H01M 2300/004; Y02E 60/122
See application file for complete search history.

(56) References Cited

U.S. PATENT DOCUMENTS

| | | | |
|---|---|---|---|
| 2005/0084765 A1* | 4/2005 | Lee ................. | H01M 4/366 429/329 |
| 2008/0131785 A1* | 6/2008 | Park ................. | H01M 10/052 429/339 |
| 2010/0183926 A1 | 7/2010 | Kim et al. | |
| 2011/0091775 A1 | 4/2011 | Lee et al. | |

FOREIGN PATENT DOCUMENTS

| | | |
|---|---|---|
| CN | 102244294 A | 11/2011 |
| EP | 2031689 A1 | 3/2009 |
| JP | 8-321312 A | 12/1996 |
| JP | 10-189008 A | 7/1998 |
| JP | 2001-196073 A | 7/2001 |
| JP | 2003-007336 A | 1/2003 |
| JP | 2004-303437 A | 10/2004 |
| JP | 2010-170991 A | 8/2010 |
| JP | 2012-531025 A | 12/2012 |

OTHER PUBLICATIONS

International Search Report issued in International Application No. PCT/JP2013/007637 dated Apr. 15, 2014, with English translation.
Chinese Office Action issued in Application No. 201380058209.7 dated Sep. 29, 2016, with English translation.

* cited by examiner

*Primary Examiner* — Laura Weiner
(74) *Attorney, Agent, or Firm* — McDermott Will & Emery LLP

(57) ABSTRACT

A nonaqueous electrolyte solution for a secondary battery includes: a nonaqueous solvent including a cyclic carbonate having at least one fluoro group on a side chain thereof, a chain carbonate, and trimethylacetonitrile; and a lithium salt dissolved in the nonaqueous solvent.

6 Claims, 5 Drawing Sheets

NONAQUEOUS ELECTROLYTE SOLUTION FOR SECONDARY BATTERY, AND LITHIUM SECONDARY BATTERY

RELATED APPLICATIONS

This application is the U.S. National Phase under 35 U.S.C. §371 of International Application No. PCT/JP2013/007637, filed on Dec. 26, 2013 which in turn claims the benefit of Japanese Application No. 2013-002100 filed on Jan. 9, 2013, the disclosures of which Applications are incorporated by reference herein.

TECHNICAL FIELD

The present application relates to nonaqueous electrolyte solutions for secondary batteries, and lithium secondary batteries.

BACKGROUND ART

In modern society with advanced information technology, the importance of mobile electronic devices such as smartphones and notebook PCs has been rapidly increasing. This has also inevitably increased the importance of secondary batteries as power sources. Among others, lithium secondary batteries have been used in most of the mobile electronic devices currently available on the market for reasons such as their high energy density.

Moreover, in recent years, with an increasing concern about the exhaustion of fossil fuels and environmental issues, attempts have been actively made to use a lithium secondary battery as the power source of an automobile, as represented by an electric vehicle (EV), a plug-in hybrid electric vehicle (PHEV), etc. A secondary battery to be installed in an automobile is required to have a better battery characteristic as compared with a secondary battery for a mobile electronic device. Particularly, there is a demand for improving the high-rate characteristic, which contributes to the acceleration of the automobile, and the energy density, which contributes to the distance to be covered. Therefore, there is also a demand for a nonaqueous electrolyte solution used in a lithium secondary battery for an automobile to have better characteristics.

As an organic solvent of a nonaqueous electrolyte solution for a lithium secondary battery, various solvents have been proposed in the art, including a cyclic carbonate such as ethylene carbonate and propylene carbonate, a chain carbonate such as dimethyl carbonate, diethyl carbonate and ethyl methyl carbonate, etc. Typically, in many cases, different ones of these cyclic carbonates and chain carbonates are mixed together at an appropriate proportion to be used as a solvent of a nonaqueous electrolyte solution.

The following two are the primary properties that are demanded as a nonaqueous electrolyte solution in order to improve the high-rate characteristic of a lithium secondary battery.

1. Ionic conductivity of nonaqueous electrolyte solution is high.
2. Interface resistance at interface between electrode and nonaqueous electrolyte solution is low.

As a specific attempt for enhancing the ionic conductivity of the nonaqueous electrolyte solution, Patent Document No. 1, for example, discloses adding 1 to 10% of a low-viscosity nitrile solvent to a mixed solvent of ethylene carbonate, vinylene carbonate and a chain carbonate. As an attempt to reduce the interface resistance, Patent Document No. 2, for example, discloses that using a silyl borate-based compound and an acid anhydride in the nonaqueous electrolyte solution improves the characteristic of the interface between the negative electrode and the nonaqueous electrolyte solution, and improves the high-rate characteristic of the battery. On the other hand, the nonaqueous electrolyte solution does not directly contribute to the improvement of the energy density of the lithium secondary battery. However, it is important to improve the characteristic of the nonaqueous electrolyte solution in order to ensure a long-term reliability of a lithium secondary battery having a high energy density.

In order to improve the energy density of a lithium secondary battery, it is effective to use a negative electrode having a lower operating potential and a positive electrode having a higher operating potential, thereby realizing a secondary battery of a high voltage specification. In such a case, the nonaqueous electrolyte solution need to be stably present in the voltage range, and for the long-term reliability of the lithium secondary battery, there are issues such as the reductive degradation of the nonaqueous electrolyte solution at the lower-potential negative electrode and the oxidative degradation of the nonaqueous electrolyte solution at the higher-potential positive electrode.

A carbon material such as graphite has been widely used as a negative electrode material having a low operating potential, and a method of forming a stable coating, referred to as SEI (Solid Electrolyte Interface), on the negative electrode surface has been generally known as a method for suppressing the reductive degradation of the nonaqueous electrolyte solution at the negative electrode. Compounds generally known to have the ability to form an SEI include ethylene carbonate, vinylene carbonate, 1,3-propanesultone, vinyl ethylene carbonate, 1,3-propanesultone, butanesultone, etc. Ethylene carbonate is often included as a high-dielectric-constant solvent by about 10 to 50% in the electrolyte solution of a lithium secondary battery. The other compounds listed above are typically included as an electrolyte solution additive by about 0.1 to 5% in the electrolyte solution. The inclusion of such an SEI-forming compound in the nonaqueous electrolyte solution suppresses continuous reductive degradation of the nonaqueous electrolyte solution, and it is therefore possible to improve the long-term reliability of the secondary battery.

A method of using fluoroethylene carbonate as a cyclic carbonate of the solvent is generally known as a method for improving the oxidation resistance at the positive electrode. As compared with ethylene carbonate, which is typically used in a lithium secondary battery used with a charging voltage of 4.2 V or less, fluoroethylene carbonate has a fluoro group introduced therein having a high electron-withdrawing property, and it is therefore possible to improve the oxidation resistance. Thus, it is known to improve the long-term reliability of a lithium secondary battery used with a charging voltage of 4.3 V or more. Although the introduction of a fluoro group lowers the reduction resistance, it is also known in the art that fluoroethylene carbonate undergoes reductive degradation at the negative electrode surface, thereby forming a stable SEI and suppressing continuous reductive degradation.

Thus, in a lithium secondary battery used with a charging voltage of 4.3 V or more, using a cyclic carbonate having a fluoro group, such as fluoroethylene carbonate, achieves a certain level of an advantageous effect in terms of ensuring a long-term reliability.

CITATION LIST

Patent Literature

[Patent Document No. 1] Japanese Laid-Open Patent Publication No. 2004-303437
[Patent Document No. 2] Japanese Laid-Open Patent Publication No. 2010-170991

SUMMARY OF INVENTION

Technical Problem

However, with conventional lithium secondary batteries described above, there has been a demand for further improving the high-rate characteristic. A non-limiting example embodiment of the present application provides a nonaqueous electrolyte solution for a secondary battery and a lithium secondary battery capable of achieving a desirable high-rate characteristic.

Solution to Problem

A nonaqueous electrolyte solution for a secondary battery in one aspect of the present invention includes: a nonaqueous solvent including a cyclic carbonate having at least one fluoro group on a side chain thereof, a chain carbonate, and trimethylacetonitrile; and a lithium salt dissolved in the nonaqueous solvent.

Advantageous Effects of Invention

With the nonaqueous electrolyte solution for a secondary battery in one aspect of the present invention, it is possible to improve the high-rate characteristic of a lithium secondary battery.

DESCRIPTION OF EMBODIMENTS

Figure 1:
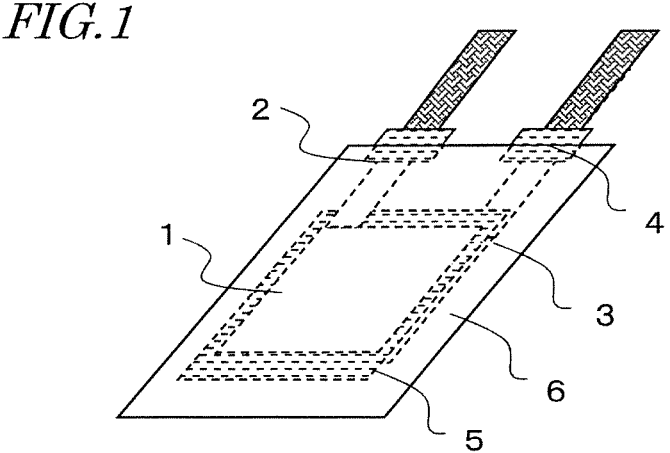
FIG. 1 A schematic perspective view showing a sheet-shaped battery, which is one aspect of a lithium secondary battery according to the present invention.

With a lithium secondary battery using a cyclic carbonate having a fluoro group in the nonaqueous electrolyte solvent, there is a demand for further improving the performance in terms of the high-rate characteristic. Particularly, when it is used as a power source of an automobile, it is necessary to further improve the high-rate characteristic, which in turn makes it necessary to reduce the internal impedance of the secondary battery.

According to a study by the present inventors, with the nonaqueous electrolyte solution disclosed in Patent Document No. 1, a certain level of output power-enhancing effect is observed owing to the improvement in the ionic conductivity of the nonaqueous electrolyte solution. With the disclosed nonaqueous electrolyte solution, however, the resistance at the interface between the electrode and the nonaqueous electrolyte solution is not lowered sufficiently. Therefore, in order to improve the high-rate characteristic, the proportion of nitrile content needs to be at least 1% or more.

With the nonaqueous electrolyte solution disclosed in Patent Document No. 2, a certain level of output power-enhancing effect is observed. However, a lithium secondary battery of a high charging voltage using fluoroethylene carbonate only had a limited effect of improving the high-rate characteristic due to the oxidative degradation of an acid anhydride, etc.

In view of such problems, the present inventors have arrived at a nonaqueous electrolyte solution for a secondary battery which has a novel composition and which can achieve a desirable high-rate characteristic when used in a secondary battery. An outline of one aspect of the present invention is as follows.

A nonaqueous electrolyte solution for a secondary battery in one aspect of the present invention includes: a nonaqueous solvent including a cyclic carbonate having at least one fluoro group on a side chain thereof, a chain carbonate, and trimethylacetonitrile; and a lithium salt dissolved in the nonaqueous solvent.

The cyclic carbonate may be at least one selected from fluoroethylene carbonate, 4,4-difluoroethylene carbonate, 4,5-difluoroethylene carbonate, fluoro-propylene carbonate, 4-fluoro-propylene carbonate, 5-fluoro-propylene carbonate, and derivatives thereof.

The cyclic carbonate may be fluoroethylene carbonate.

The chain carbonate may be at least one selected from dimethyl carbonate, ethyl methyl carbonate, diethyl carbonate, and derivatives thereof.

The trimethylacetonitrile may be included at a proportion of 0.05 mol/L or more and 0.2 mol/L or less with respect to a total amount of the nonaqueous electrolyte solution for a secondary battery.

A lithium secondary battery in one aspect of the present invention includes: a positive electrode; a negative electrode; and any of the nonaqueous electrolyte solutions for a secondary battery set forth above.

A lithium secondary battery in one aspect of the present invention is manufactured by using: a positive electrode; a negative electrode; and any of the nonaqueous electrolyte solutions for a secondary battery set forth above.

The negative electrode may have a negative electrode active material including graphite.

Embodiments of the present invention will now be described in detail.

First Embodiment

An embodiment of a nonaqueous electrolyte solution for a secondary battery according to the present invention will be described.

A nonaqueous electrolyte solution for a secondary battery of the present embodiment includes: a nonaqueous solvent including a cyclic carbonate having at least one fluoro group on a side chain thereof, a chain carbonate, and trimethylacetonitrile; and a lithium salt dissolved in the nonaqueous solvent.

The cyclic carbonate having at least one fluoro group on a side chain thereof may be fluoroethylene carbonate, 4,4-difluoroethylene carbonate, 4,5-difluoroethylene carbonate, fluoro-propylene carbonate, 4-fluoro-propylene carbonate, 5-fluoro-propylene carbonate, a derivative thereof, etc. One of these compounds may be used alone, or two or more of them may be used in combination, as necessary. Particularly, fluoroethylene carbonate may be selected for it is relatively easy to synthesize and easily available.

The chain carbonate may be dimethyl carbonate, ethyl methyl carbonate, diethyl carbonate, a derivative thereof, etc. The derivative may be a fluorinated substance obtained by partly substituting hydrogen groups of these carbonates with fluoro groups for the high oxidation resistance. One of these compounds may be used alone, or two or more of them may be used in combination, as necessary.

A nonaqueous electrolyte solution for a secondary battery of the present embodiment includes trimethylacetonitrile as a nonaqueous solvent. Then, it is possible to improve the high-rate characteristic of the secondary battery. As disclosed in Patent Document No. 1, it is believed that a nitrile serves to improve the ionic conductivity of a nonaqueous electrolyte solution. The present inventors found that it is possible to achieve a desirable high-rate characteristic of the secondary battery by including trimethylacetonitrile in the nonaqueous electrolyte solution, among other nitriles. As will be described in detail in Examples below, it is believed that this is because the inclusion of trimethylacetonitrile and a cyclic carbonate having at least one fluoro group on a side chain thereof forms a low-resistance coating at the interface between the negative electrode and the nonaqueous electrolyte solution of the secondary battery. According to an in-depth study by the present inventors, it is believed that this effect cannot be sufficiently obtained with those other than trimethylacetonitrile, i.e., acetonitrile, valeronitrile, cyclopentanecarbonitrile, adiponitrile, or pimelonitrile.

The lithium salt dissolved in the nonaqueous solvent may be any of various electrolytes known in the art for use in a nonaqueous electrolyte solution of a lithium secondary battery, such as $LiClO_4$, $LiBF_4$, $LiPF_6$, $LiCF_3SO_3$, $LiN(CF_3SO_2)_2$, etc. It may be at least one selected from $LiBF_4$ and $LiPF_6$ in view of the overall balance of characteristics such as the stability and the ionic conductivity.

In the nonaqueous electrolyte solution for a secondary battery of the present embodiment, the cyclic carbonate having at least one fluoro group on a side chain thereof and the chain carbonate may be included at any proportion as long as these compounds are compatible with each other and they produce a uniform liquid. For example, the amount added of the cyclic carbonate having at least one fluoro group on a side chain thereof is 2 to 50%, and the amount added of the chain carbonate is 50 to 80%. If the proportion of the cyclic carbonate having a fluoro group is less than 20%, at least one kind of a cyclic carbonate having no fluoro group may be added so that the total proportion of the cyclic carbonate having a fluoro group and the cyclic carbonate having no fluoro group is 20% or more for the solubility of the lithium salt.

Trimethylacetonitrile may be included at a proportion of 0.05 mol/L or more and 0.2 mol/L or less with respect to the total amount of the nonaqueous electrolyte solution for a secondary battery. If the amount added of trimethylacetonitrile is less than 0.05 mol/L, the desirable high-rate characteristic will not be improved sufficiently as will be described below. If the amount added of trimethylacetonitrile exceeds 0.2 mol/L, an excess of trimethylacetonitrile that does not contribute to the coating formation will lower the cycle characteristic.

There is no particular limitation on the concentration of the lithium salt in the nonaqueous electrolyte solution, the concentration can be determined arbitrarily based, for example, on the specifications of the secondary battery using the nonaqueous electrolyte solution for a secondary battery, as long as a uniform nonaqueous electrolyte solution for a secondary battery can be obtained. For example, the concentration of the lithium salt is 0.5 mol/L or more and 1.5 mol/L or less with respect to the total amount of the nonaqueous electrolyte solution for a secondary battery.

In addition to the compounds described above, the nonaqueous electrolyte solution for a secondary battery of the present embodiment may further include at least one of a cyclic carbonate having no fluoro group and a chain carboxylate.

The cyclic carbonate having no fluoro group may be ethylene carbonate, propylene carbonate, butylene carbonate, vinylene carbonate, methylvinylene carbonate, vinyl ethylene carbonate, divinyl ethylene carbonate, a derivative thereof, etc. One of these may be used alone, or two or more of them may be used in combination, as necessary.

The chain carboxylate may be methyl acetate, ethyl acetate, propyl acetate, methyl propionate, ethyl propionate, propyl propionate, a derivative thereof, etc. The derivative may be a fluorinated substance obtained by partly substituting hydrogen groups of the carboxylate with fluoro groups for the oxidation resistance.

In the nonaqueous electrolyte solution for a secondary battery of the present embodiment, since the cyclic carbonate having at least one fluoro group on a side chain thereof has fluoro groups, it has a relatively low reduction resistance and it is easily reduced and degraded at the negative electrode. It is believed that at the potential at which the cyclic carbonate having at least one fluoro group on a side chain thereof is reduced and degraded at the negative electrode, trimethylacetonitrile is reduced and degraded at the same time. It is believed that the degradation product of the reduction of the cyclic carbonate having at least one fluoro group on a side chain thereof and trimethylacetonitrile forms a coating (composite SEI) on the negative electrode. As will be described in Examples below, it is believed that since this coating has a low resistance, the interface resistance at the interface between the electrode and the nonaqueous electrolyte solution is small, and a desirable high-rate characteristic can be achieved.

Second Embodiment

An embodiment of a lithium secondary battery according to the present invention will now be described.

Figure 2:
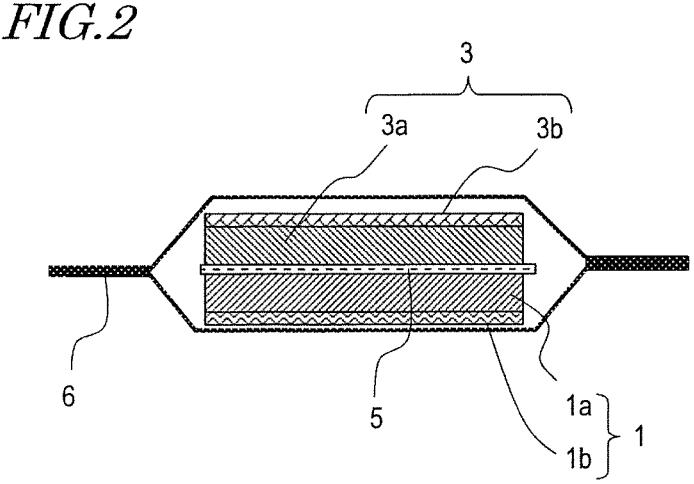
FIG. 2 A schematic cross-sectional view of the lithium secondary battery shown in FIG. 1.

FIGS. 1 and 2 are a perspective view and a cross-sectional view, respectively, showing a lithium secondary battery of the present embodiment. The lithium secondary battery of the present embodiment includes a positive electrode 1, a negative electrode 3, a separator 5 located between the positive electrode 1 and the negative electrode 3, a battery casing 6, and a nonaqueous electrolyte solution 7. The positive electrode 1, the negative electrode 3 and the separator 5 are housed in the battery casing 6. The inside of the battery casing 6 is filled with the nonaqueous electrolyte solution 7. A positive electrode tab lead 2 and a negative electrode tab lead 4 are connected to the positive electrode 1 and the negative electrode 3, respectively, and the positive electrode tab lead 2 and the negative electrode tab lead 4 are extended to the outside of the battery casing 6.

The nonaqueous electrolyte solution for a secondary battery of the first embodiment is used as the nonaqueous electrolyte solution 7.

The positive electrode 1 and the negative electrode are each capable of absorbing/desorbing lithium. The positive electrode 1 includes a positive electrode current collector 1b, and a positive electrode mixture layer 1a provided on the surface of the positive electrode current collector 1b.

The material of the positive electrode current collector 1b may be any material as long as it is an electron conductor that causes no chemical reaction at the charging/discharging potential for the positive electrode 1. For example, it may be stainless steel, aluminum, titanium, carbon, a conductive resin, etc.

The positive electrode mixture layer 1a includes a positive electrode active material capable of electrochemically and reversibly absorbing/desorbing lithium, a conductive agent, a binder, etc. The positive electrode active material may be, for example, $Li_xCoO_2$, $Li_xNiO_2$, $Li_xMnO_2$, $Li_xCo_yNi_zMn_{1-y-z}O_2$, $Li_xMn_2O_4$, etc., where $0 \leq x \leq 1$, $0 \leq y \leq 1$, $0 \leq y+z \leq 1$ and $0 \leq z \leq 1$.

The conductive agent may be any electron conductive material that causes no chemical change at the charging/discharging potential for the positive electrode 1. For example, it may be a conductive fiber such as a graphite, a carbon black, a carbon fiber and a metal fiber, a metal powder, a conductive whisker, a conductive metal oxide, an organic conductive material, etc., which may be used alone or as a mixture.

The binder may be either a thermoplastic resin or a thermosetting resin. For example, it may be a polyolefin resin such as polyethylene and polypropylene, a fluorine-based resin such as polytetrafluoroethylene (PTFE), polyvinylidene fluoride (PVDF) and hexafluoropropylene (HFP), or a copolymer resin thereof, a polyacrylic acid or a copolymer resin thereof, etc.

Other than the conductive agent and the binder, a filler, a dispersant, an ion conductor, a pressure enhancer, and various other additives may be used.

The negative electrode 3 includes a negative electrode current collector 3b, and a negative electrode mixture layer 3a provided on the surface of the negative electrode current collector 3b. As will be described below, as the lithium secondary battery of the present embodiment is charged/discharged, a coating is formed on the surface of the negative electrode 3, which coating includes a degradation product of the reduction of the cyclic carbonate having at least one fluoro group on a side chain thereof and trimethylacetonitrile.

For example, the negative electrode current collector 3b may be a copper foil, a nickel foil, a stainless foil, etc.

The negative electrode mixture layer 3a includes a negative electrode active material. For example, the negative electrode active material may be a graphite such as an artificial graphite, a natural graphite, a hardly graphitizable amorphous carbon, an easily graphitizable amorphous carbon, etc. The negative electrode mixture layer 3a may further include a binder described above.

The separator 5 may be a microporous film that has a high ion permeability, has a predetermined mechanical strength, and is insulative. For example, it may be a sheet, a nonwoven fabric or a woven fabric of a polyolefin resin such as polypropylene and polyethylene or a glass fiber, etc. The thickness of the separator is typically from $10\mu$ to 300 μm.

As will be described in detail in Examples below, the lithium secondary battery of the present embodiment can be manufactured by producing the positive electrode 1 and the negative electrode 3, housing them in the battery casing 6 with the separator 5 interposed therebetween, filling the inside with the nonaqueous electrolyte solution 7, and then sealing the battery casing 6.

Although FIG. 1 shows a sheet-shaped lithium secondary battery, the lithium secondary battery of the present embodiment may have any other suitable shape, and may have a coin shape, a button shape, a stacked shape, a cylindrical shape, a flat shape, a rectangular shape, etc.

While the lithium secondary battery of the present embodiment can be used with personal digital assistants, portable electronic devices, household small power storage units, motorcycles, electric vehicles (EV), hybrid electric vehicles (PHEV), etc., the application is not limited thereto, and it can be used with other devices.

As described above in the first embodiment, with the lithium secondary battery of the present embodiment, a degradation product of the reduction of the cyclic carbonate having at least one fluoro group on a side chain thereof and trimethylacetonitrile forms a coating on the negative electrode during the initial charging/discharging or the initial period after starting to use the lithium secondary battery. This decreases the interface resistance at the interface between the electrode and the nonaqueous electrolyte solution, allowing the lithium secondary battery to have a desirable high-rate characteristic. Particularly, a lithium secondary battery having a high charging voltage over 4.3 V is provided with a desirable high-rate characteristic. Therefore, the lithium secondary battery of the present embodiment can be suitably used with electric vehicles or hybrid electric vehicles that are required to have a high energy density and a desirable high-rate characteristic, for example.

Note that with the lithium secondary battery of the present embodiment, in a state after the lithium secondary battery is produced and before it is initially charged/discharged, the coating on the negative electrode surface described above has not been formed. Typically, however, lithium secondary batteries are sold as products after they are initially charged/discharged. Therefore, at the point when a user uses one, a coating has been formed on the negative electrode surface, and the advantageous effects of the lithium secondary battery of the present embodiment described above can be achieved. Even if a lithium secondary battery of an embodiment has not been initially charged/discharged, as the lithium secondary battery is used, i.e., as it is charged/discharged, a coating is formed on the negative electrode surface. Therefore, also in such a case, at the point when a user uses a lithium secondary battery of an embodiment, it can achieve the advantageous effects described above.

With the lithium secondary battery of the present embodiment, as a coating is formed on the negative electrode surface, the cyclic carbonate having at least one fluoro group on a side chain thereof and trimethylacetonitrile are partly consumed, reducing the concentrations of these compounds in the nonaqueous electrolyte solution. Thus, where the amount of trimethylacetonitrile added in the nonaqueous electrolyte solution used in the production, the nonaqueous electrolyte solution of the lithium secondary battery of the present embodiment may hardly contain any trimethylacetonitrile. Even in such a case, it is possible to detect a trace amount of trimethylacetonitrile included in the nonaqueous electrolyte solution by an analytical chemical method such as mass spectrometry. It is also possible to confirm that trimethylacetonitrile was included in the nonaqueous electrolyte solution by analyzing the coating formed on the surface of the negative electrode.

EXAMPLES

Examples along with Reference Examples will now be described, as specific examples of the first and second embodiments. Examples below are illustrative, and the present invention is not limited to Examples below.

1. Production of Samples

Example 1

(1) Preparation of Nonaqueous Electrolyte Solution

In a mixed solvent (volume ratio: 1:3) of fluoroethylene carbonate (CAS number: 114435-02-8) and ethyl methyl carbonate (CAS number: 623-53-0), 1.0 mol/L of $LiPF_6$ (CAS number: 21324-40-3) was dissolved. To the obtained solution, 0.06 mol/L of trimethylacetonitrile (CAS number: 630-18-2) was added, obtaining an electrolyte solution.

(2) Production of Positive Electrode Active Material

As the positive electrode active material, $LiCo_{1/3}Ni_{1/3}Mn_{1/3}O_2$ was used. First, a prepared aqueous solution containing nickel sulfate (CAS number: 7786-81-4), manganese sulfate (CAS number: 7785-87-7) and cobalt sulfate (CAS number: 10124-43-3) at an equal molarity was supplied continuously to a reaction vessel. Then, a precursor of the active material was synthesized while dripping sodium hydroxide into the reaction vessel so that the pH of the water was 10 to 13, and was sufficiently rinsed and dried. Thus, a hydroxide made of $Ni_{1/3}Mn_{1/3}Co_{1/3}(OH)_2$ was obtained. This precursor and lithium carbonate were mixed together so that the molar ratio between lithium, nickel, cobalt and manganese was 3:1:1:1. The mixture was subjected to preliminary baking for 7 hours at 500° C. in an oxygen atmosphere, and pulverized. Next, the baked and pulverized product was baked again for 15 hours at 800° C. The baked product was pulverized and then classified, thereby obtaining a positive electrode active material represented by the composition formula $LiNi_{1/3}Mn_{1/3}Co_{1/3}O_2$.

(3) Production of Positive Electrode

Ninety-two parts by weight of $LiCo_{1/3}Ni_{1/3}Mn_{1/3}O_2$ (as a positive electrode active material), 5 parts by weight of acetylene black (as a conductive agent), and 3 parts by weight of a polyvinylidene fluoride resin (as a binder) were mixed together, and they were dispersed in dehydrated N-methyl-2-pyrrolidone, thereby preparing a slurry-like positive electrode mixture. This positive electrode mixture was applied only on one side of a positive electrode current collector made of an aluminum foil having a thickness of 15 µm, and dried, after which it was rolled out to obtain a positive electrode plate. The amount of the positive electrode mixture applied was 15 mg/cm² after drying.

(4) Production of Negative Electrode

Ninety-eight parts by weight of an artificial graphite powder, 1 part by weight of a styrene-butadiene rubber, and 1 part by weight of carboxymethylcellulose were mixed together, and they were dispersed in water, thereby preparing a slurry-like negative electrode mixture. This negative electrode mixture was applied only on one side of a negative electrode current collector made of a copper foil having a thickness of 10 µm, and dried, after which it was rolled out to obtain a negative electrode. The amount of the negative electrode mixture applied was 8 mg/cm² after drying.

(5) Production of Sheet Battery

Figure 3:
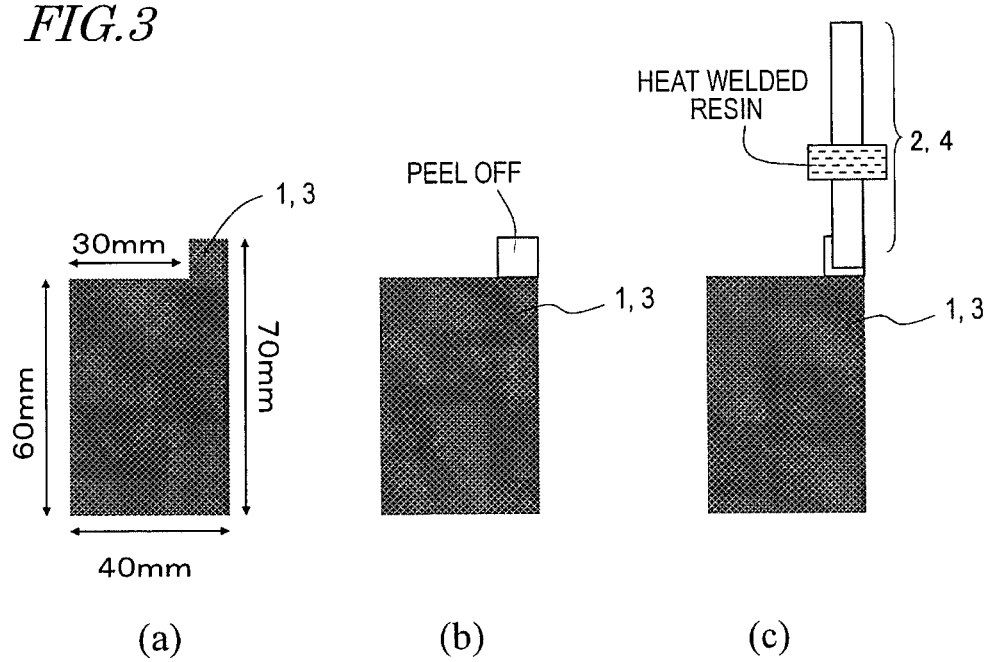
FIG. 3 (a) to (c) show the procedure of processing the positive electrode and the negative electrode of the lithium secondary battery shown in FIG. 1.
Figure 4:
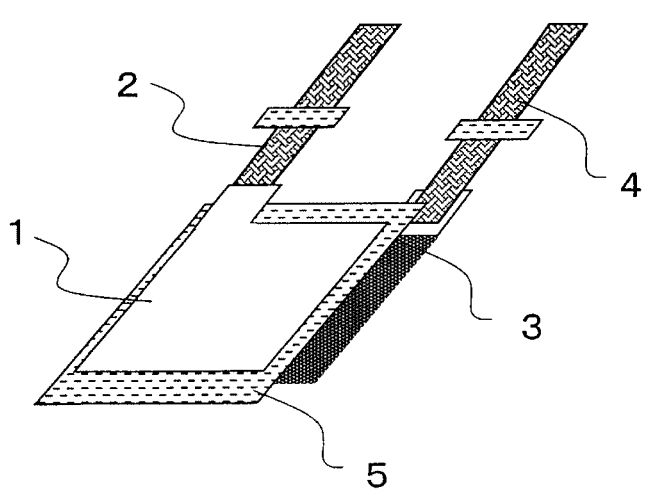
FIG. 4 A schematic perspective view of a group of electrodes of the lithium secondary battery shown in FIG. 1.

A sheet-shaped lithium secondary battery shown in FIGS. 1 and 2 was produced. First, the positive electrode 1 and the negative electrode 3 were each processed into a size shown in FIG. 3(a). Then, as shown in FIG. 3(b), a portion of the positive electrode mixture layer and the negative electrode mixture layer to which a tab lead is connected was peeled off, and the tab lead was connected to the exposed current collector. As shown in FIG. 3, the electrode area was 24 cm² for the positive electrode 1 and for the negative electrode 3. The positive electrode tab lead 2 was made of aluminum, and the negative electrode tab lead 4 was made of nickel. A heat welded resin is welded to these tab leads as shown in FIG. 3(c). The positive electrode 1 and the negative electrode 3, which have been processed according to FIGS. 3(a) to 3(c), were placed to oppose each other so that the electrodes are aligned together with a separator (made of polypropylene, thickness: 30 µm) interposed therebetween, as shown in FIG. 4. Next, an aluminum laminate (thickness: 100 µm) to be the battery casing 6 that has been cut into a rectangular shape of 120×120 mm was folded in two, and the 120-mm edge was thermally sealed at 230° C., into an envelop shape of 120×60 mm. The electrodes opposing each other as shown in FIG. 4 were inserted through a 60-mm edge, and the edge of the aluminum laminate was thermally sealed at 230° C. while it was aligned with the heat welded resins of the tab leads as shown in FIG. 1. Next, 0.8 cc of the nonaqueous electrolyte solution was injected through an unsealed side of the laminate. After the injection, it was left standing for 15 minutes under a vacuum of 0.06 MPa, allowing the inside of the battery casing 6 impregnated with the nonaqueous electrolyte solution 7. Finally, the edge of the laminate, through which the solution was injected, was thermally sealed at 230° C.

Example 2

The same lithium secondary battery as that of Example 1 was produced except that the concentration of trimethylacetonitrile (TAN) in the nonaqueous electrolyte solution was 0.12 mol/L.

Reference Example 1

The same lithium secondary battery as that of Example 1 was produced except that no TAN was contained in the nonaqueous electrolyte solution.

Reference Example 2

The same lithium secondary battery as that of Example 1 was produced except that the nonaqueous electrolyte solution contained no TAN but contained 0.06 mol/L of acetonitrile (AN) (CAS number: 75-05-8).

Reference Example 3

The same lithium secondary battery as that of Example 1 was produced except that the nonaqueous electrolyte solution contained no TAN but contained 0.06 mol/L of valeronitrile (BN) (CAS number: 110-59-8).

Reference Example 4

The same lithium secondary battery as that of Example 1 was produced except that the nonaqueous electrolyte solution contained no TAN but contained 0.06 mol/L of cyclopentanecarbonitrile (CPN) (CAS number: 4254-02-8).

Reference Example 5

The same lithium secondary battery as that of Example 1 was produced except that the nonaqueous electrolyte solution contained no TAN but contained 0.06 mol/L of adiponitrile (ADN) (CAS number: 111-69-3).

Reference Example 6

The same lithium secondary battery as that of Example 1 was produced except that the nonaqueous electrolyte solution contained no TAN but contained 0.06 mol/L of pimelonitrile (PN) (CAS number: 646-20-8).

Reference Example 7

The same lithium secondary battery as that of Example 1 was produced except that ethylene carbonate (EC) (CAS number: 96-49-1) was used instead of fluoroethylene carbonate (FEC) in the aqueous electrolyte solution, and that the aqueous electrolyte solution contained no TAN.

Reference Example 8

The same lithium secondary battery as that of Example 1 was produced except that EC was used instead of FEC in the nonaqueous electrolyte solution.

Reference Example 9

The same lithium secondary battery as that of Example 1 was produced except that EC was used instead of FEC in the nonaqueous electrolyte solution, that the nonaqueous electrolyte solution contained no TAN, and that 1 wt % of vinylene carbonate (VC) (CAS number: 872-36-6) was added thereto.

Reference Example 10

The same lithium secondary battery as that of Example 1 was produced except that EC was used instead of FEC in the nonaqueous electrolyte solution, and that 1 wt % of VC was added thereto.

2. Evaluation of Batteries

Figure 5:
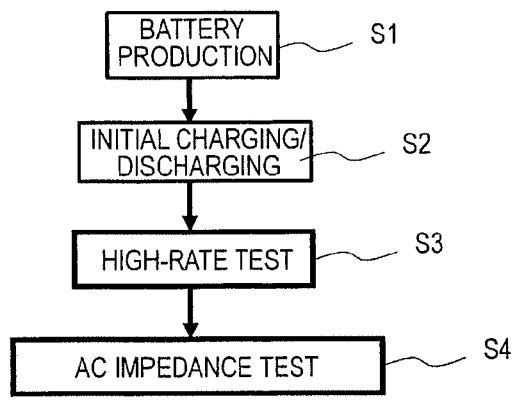
FIG. 5 A flow chart showing a testing procedure for Examples.

The produced batteries of Examples 1 and 2 and Reference Examples 1 to 10 were evaluated by the procedure shown in FIG. 5. Specifically, after the lithium secondary batteries were produced as described above (S1), they were initially charged/discharged (S2). Then, they were subjected to a high-rate test (S3) and an AC impedance test (S4).

When evaluating each battery, 80×80 cm stainless steel plates (thickness: 2 mm) were placed on the battery casing 6 of the battery, and the battery was pressed at 0.2 MPa by means of a U-shaped clamp. The evaluations were all conducted in a thermostatic vessel held at 25° C. In the initial charging/discharging, it was charged with a constant current and discharged with a constant current three times repeatedly at a current density of 0.1 mA/cm$^2$ (per positive electrode area). The constant-current charging was stopped at a battery voltage of 4.4 V, and the constant-current discharge was stopped at a battery voltage of 3.0 V. Between a charge and a discharge, it was left standing with an open circuit for 20 minutes.

[High-rate test] Each battery produced was charged to 4.4 V with a constant current at a current value of 1 mA/cm$^2$ (per positive electrode area), and then charged with a constant voltage of 4.4 V until the current value became less than 0.1 mA/cm$^2$. Then, it was left standing with an open circuit for 20 minutes, and discharged with a current value at a rate of 10 mA/cm$^2$, measuring the discharge capacity. The same battery was charged by the above-described method, left standing with an open circuit for 20 minutes, and was discharged with a current value at a rate of 0.1 mA/cm$^2$, measuring the discharge capacity. The proportion of the discharge capacity at 10 mA/cm$^2$ with respect to the discharge capacity at 0.1 mA/cm$^2$ was obtained as a percentage, which was used as the high-rate characteristic R[%]. The results are shown in Table 1.

[AC impedance test] Each battery produced was charged to 4.4 V with a constant current at a current value of 1 mA/cm$^2$ (per positive electrode area), and then charged with a constant voltage of 4.4 V until the current value became less than 0.1 mA/cm$^2$. Then, it was left standing for one hour under a 25° C. environment, and an AC impedance measurement was conducted. The measurement conditions are shown in Table 2. The impedance measurement results were plotted on a Nyquist plot representing the real component of the impedance along the X axis, and the imaginary component thereof along the Y axis. The results are shown in FIG. 7 to FIG. 10.

Figure 6:
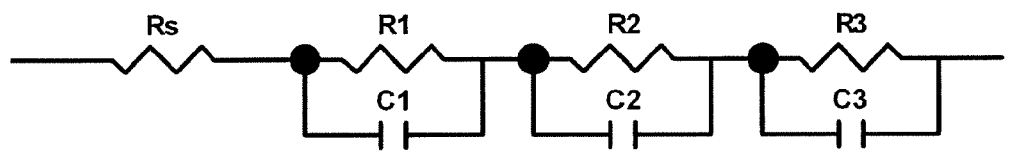
FIG. 6 An equivalent circuit used for fitting the AC impedance measurement results of Examples.

On a Nyquist plot, the charge transfer across the positive electrode/nonaqueous electrolyte solution interface and the charge transfer across the negative electrode/nonaqueous electrolyte solution interface are represented as semicircular arc components, with the diameter of a semicircular arc representing the resistance value of the charge transfer resistance. Therefore, the larger the arc, the larger the charge transfer resistance is, and the lower the output power of the battery is. Since it is believed that a charge transfer reaction across the electrode/nonaqueous electrolyte solution interface is composed of a plurality of elementary reactions, a plurality of arc components are shown on a Nyquist plot. The Nyquist plots shown in FIG. 7 were obtained from the batteries of Examples 1 and 2 used in this measurement. Assuming three arc components, fitting was attempted by using an equivalent circuit shown in FIG. 6, and the fitting was successful with a resistance fitting tolerance within 3%. As for attribution and interpretation of arc components, various discussions have been made in the art but no unified view has been reached. In this example, discussion will be made while treating the total value $R_{CT}$ of the three different charge transfer resistances R1 to R3 as being the charge transfer resistance of the battery as a whole. Fitting was performed using the equivalent circuit shown in FIG. 6 for the Nyquist plots shown in FIG. 7, and the obtained $R_{CT}$ values are shown in Table 1. Rs in the equivalent circuit of FIG. 6 is a resistance component including the electronic resistance in the electrode core material and the ion transfer resistance in the nonaqueous electrolyte solution, and it reflects the value of the left-side intersection between an arc and the X axis in a Nyquist plot. R1 to R3 in the equivalent circuit of FIG. 6 are each a charge transfer resistance at the electrode/nonaqueous electrolyte solution interface, and the total value $R_{CT}$ thereof reflects the length of the diameter of the semicircular arc in the X-axis direction in a Nyquist plot. C1 to C3 in the equivalent circuit of FIG. 6 each represent the electric double layer capacitance at the electrode/nonaqueous electrolyte solution interface.

Figure 7:
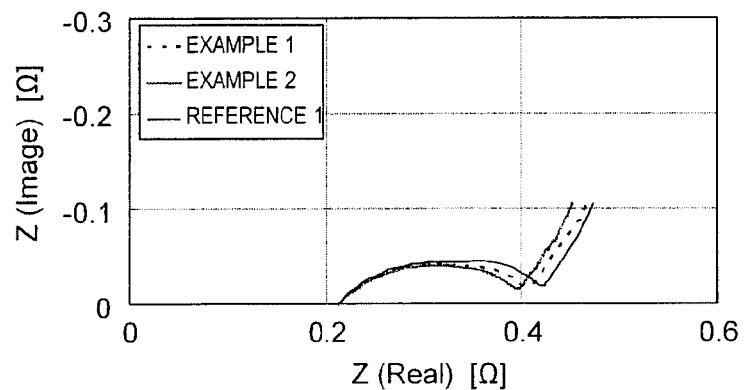
FIG. 7 Nyquist plots obtained by AC impedance measurement for Examples 1 and 2 and Reference Example 1.
Figure 8:
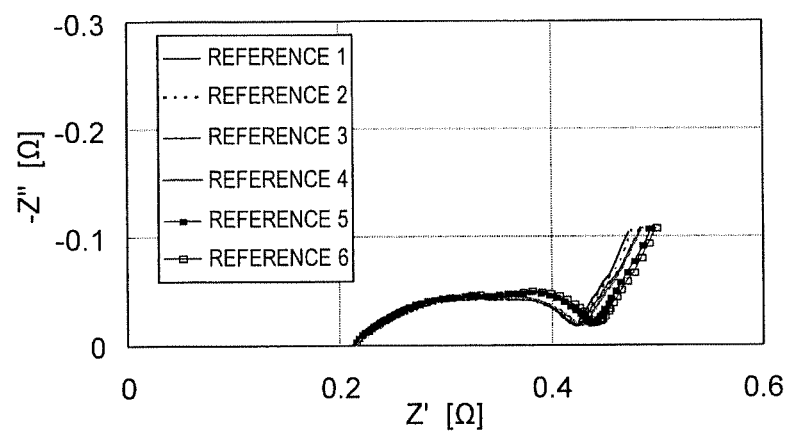
FIG. 8 Nyquist plots obtained by AC impedance measurement for Reference Examples 1 to 6.
Figure 9:
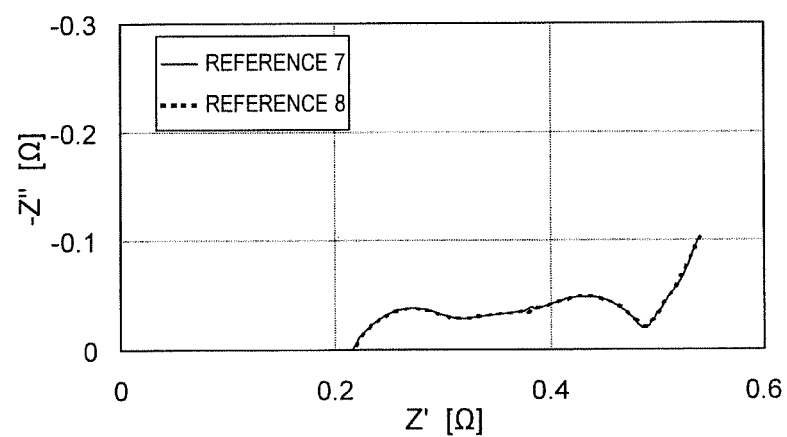
FIG. 9 Nyquist plots obtained by AC impedance measurement for Reference Examples 7 and 8.
Figure 10:
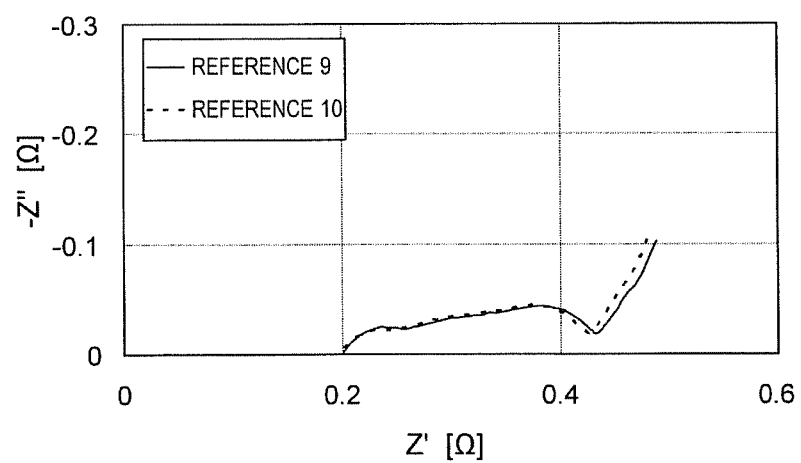
FIG. 10 Nyquist plots obtained by AC impedance measurement for Reference Examples 9 and 10.

FIG. 7 also shows the results for Reference Example 1. FIG. 8 shows Nyquist plots for batteries of Reference Examples 1 to 6. Similarly, FIG. 9 shows Nyquist plots for batteries of Reference Examples 7 and 8. FIG. 10 shows Nyquist plots for batteries of Reference Examples 9 and 10.

TABLE 1

| | Cyclic carbonate | Nitrile compound | Nitrile concentration [mol/L] | R[%] | $R_{CT}[\Omega]$ |
|---|---|---|---|---|---|
| Example 1 | FEC | TAN | 0.06 | 81 | 203 |
| Example 2 | FEC | TAN | 0.15 | 83 | 194 |
| Reference 1 | FEC | N/A | N/A | 75 | 214 |
| Reference 2 | FEC | AN | 0.06 | 74 | 220 |
| Reference 3 | FEC | BN | 0.06 | 73 | 215 |
| Reference 4 | FEC | CPN | 0.06 | 75 | 219 |
| Reference 5 | FEC | ADN | 0.06 | 68 | 234 |
| Reference 6 | FEC | PN | 0.06 | 66 | 241 |
| Reference 7 | EC | N/A | N/A | 61 | 285 |
| Reference 8 | EC | TAN | 0.06 | 62 | 285 |
| Reference 9 | EC + VC | N/A | N/A | 64 | 243 |
| Reference 10 | EC + VC | TAN | 0.06 | 63 | 243 |

TABLE 2

| | |
|---|---|
| Frequency response analyzer | Solartron 1255B |
| Measurement software | Zplot |
| Analysis software | Zview |
| Measurement voltage | OCV |
| Measurement frequency band | 1000 kHz-50 mHz |
| AC amplitude | 10 mV |
| Measurement temperature | 25° C. |

3. Results and Discussion

The results for Examples 1 and 2 and Reference Example 1 indicate that for a lithium secondary battery containing fluoroethylene carbonate (FEC) in the nonaqueous electrolyte solution, the addition of trimethylacetonitrile (TAN) improved the high-rate characteristic, achieving a high-rate characteristic (R in Table 1) of 80% or more. Moreover, for a lithium secondary battery containing fluoroethylene carbonate in the nonaqueous electrolyte solution, the addition of trimethylacetonitrile decreased the charge transfer resistance ($R_{CT}$ in Table 1) by about 5% or more. It is believed that these advantageous effects are expressed because fluoroethylene carbonate and trimethylacetonitrile, which have a low reduction resistance, form a composite SEI on the negative electrode, and the SEI has a lower resistance than an SEI formed by fluoroethylene carbonate alone.

The results for Reference Example 1 to Reference Example 6 indicate that the high-rate characteristic is 80% or less and is not improved when acetonitrile (AN), valeronitrile (EN), cyclopentanecarbonitrile (CPN), adiponitrile (ADN) or pimelonitrile (PN) is added instead of trimethylacetonitrile (TAN), with a lithium secondary battery containing fluoroethylene carbonate in the nonaqueous electrolyte solution. Moreover, with the addition of these nitrile compounds, the charge transfer resistance was 210Ω or more, and the charge transfer resistance was not lowered. From these results, it is believed that a low-resistance composite coating is not formed on the negative electrode by the combination of fluoroethylene carbonate with acetonitrile, valeronitrile, cyclopentanecarbonitrile, adiponitrile or pimelonitrile.

The results for Reference Examples 7 and 8 indicate that the combination of ethylene carbonate and trimethylacetonitrile cannot achieve the effect of improving the high-rate characteristic or decreasing the charge transfer resistance. Therefore, it is believed that a low-resistance composite SEI cannot be formed on the negative electrode by ethylene carbonate and trimethylacetonitrile.

Where the solvent of a nonaqueous electrolyte solution for a lithium secondary battery is a mixed solvent of ethylene carbonate and chain carbonate, it is common to add about 0.1 to 5 wt % of vinylene carbonate as a negative electrode SEI-forming additive in order to ensure a high long-term reliability. The results for Reference Examples 9 and 10 indicate that a low-resistance composite SEI is not formed on the negative electrode even with the combination of vinylene carbonate and trimethylacetonitrile.

From these results, it is believed that the effect of the present embodiment of decreasing the charge transfer resistance and that of improving the high-rate characteristic are unique effects that are expressed when fluoroethylene carbonate and trimethylacetonitrile are used in combination.

The cyclic carbonates having a fluoro group on a side chain thereof listed above in the first embodiment have generally the same reduction potential and generally the same reductive degradation mechanism as those of fluoroethylene carbonate. Therefore, it is believed that a nonaqueous electrolyte solution for a secondary battery that contains such a cyclic carbonate having a fluoro group on a side chain thereof and trimethylacetonitrile can also achieve the effect of improving the high-rate characteristic and decreasing the charge transfer resistance, as in Examples 1 and 2.

INDUSTRIAL APPLICABILITY

The nonaqueous electrolyte solution for a secondary battery of the present invention is useful as a nonaqueous electrolyte solution for a secondary battery that is required to have a desirable high-rate characteristic. Since the oxidation resistance is high, it is particularly useful as a nonaqueous electrolyte solution for a lithium secondary battery that is required to have a high charging voltage. Moreover, the lithium secondary battery of the present invention is useful as a lithium secondary battery that is required to have a desirable high-rate characteristic. It is particularly useful as a lithium secondary battery that is required to have a high charging voltage.

From these advantages, the present invention is suitable as a secondary battery or a nonaqueous electrolyte solution for a secondary battery for EVs and PHEVs, for which a high energy density and a high-rate characteristic are required.

REFERENCE SIGNS LIST 1 positive electrode
1a positive electrode mixture layer
1b positive electrode current collector
2 positive electrode tab lead
3 negative electrode
3a negative electrode mixture layer
3b negative electrode current collector
4 negative electrode tab lead
5 separator 6 battery casing
7 nonaqueous electrolyte solution

The invention claimed is:

1. A nonaqueous electrolyte solution for a secondary battery comprising:
   a nonaqueous solvent including a cyclic carbonate having at least one fluoro group on a side chain thereof, a chain carbonate, and trimethylacetonitrile; and
   a lithium salt dissolved in the nonaqueous solvent,
   wherein the trimethylacetonitrile is included at a proportion of 0.05 mol/L or more and 0.2 mol/L or less with respect to a total amount of the nonaqueous electrolyte solution for a secondary battery.

2. The nonaqueous electrolyte solution for a secondary battery of claim 1, wherein the cyclic carbonate is at least one selected from fluoroethylene carbonate, 4,4-difluoroethylene carbonate, 4,5-difluoroethylene carbonate, fluoro-propylene carbonate, 4-fluoro-propylene carbonate, 5-fluoro-propylene carbonate, and derivatives thereof.

3. The nonaqueous electrolyte solution for a secondary battery of claim 1, wherein the cyclic carbonate is fluoroethylene carbonate.

4. The nonaqueous electrolyte solution for a secondary battery of claim 1, wherein the chain carbonate is at least one selected from dimethyl carbonate, ethyl methyl carbonate, diethyl carbonate, and derivatives thereof.

5. A lithium secondary battery comprising:
   a positive electrode;
   a negative electrode; and
   a nonaqueous electrolyte solution for a secondary battery of claim 1.

6. The lithium secondary battery of claim 5, wherein the negative electrode has a negative electrode active material including graphite.

* * * * *